US012664555B2

(12) United States Patent (10) Patent No.: US 12,664,555 B2
Nadi et al. (45) Date of Patent: Jun. 23, 2026

(54) METHODS AND SYSTEMS FOR REDUCING FALSE POSITIVES FOR FINANCIAL TRANSACTION FRAUD MONITORING USING ARTIFICIAL INTELLIGENCE

(71) Applicant: Mastercard International Incorporated, Purchase, NY (US)

(72) Inventors: Fariborz Nadi, Fairfield, CA (US); Jose Qiu Chou, San Leandro, CA (US); Yuanzheng Du, San Francisco, CA (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 19/053,850

(22) Filed: Feb. 14, 2025

(65) Prior Publication Data

US 2025/0190993 A1 Jun. 12, 2025

Related U.S. Application Data

(63) Continuation of application No. 17/828,970, filed on May 31, 2022, now abandoned.

(51) Int. Cl.
*G06Q 40/00* (2023.01)
*G06N 20/00* (2019.01)
*G06Q 20/40* (2012.01)
(52) U.S. Cl.
CPC ................................ *G06Q 20/4016* (2013.01)

(58) Field of Classification Search
USPC .......................................................... 705/75
See application file for complete search history.

(56) References Cited

U.S. PATENT DOCUMENTS

| | | | |
|---|---|---|---|
| 2021/0042667 A1* | 2/2021 | Ghosh .................... | G16H 50/70 |
| 2023/0229890 A1* | 7/2023 | Kou ....................... | G06N 3/045 |
| | | | 706/25 |
| 2024/0177071 A1* | 5/2024 | Wang .................... | G06N 3/0442 |
| 2024/0242081 A1* | 7/2024 | Monshizadeh ...... | G06N 3/0895 |
| 2024/0430172 A1* | 12/2024 | Le Guyadec ........... | H04L 41/16 |

* cited by examiner

*Primary Examiner* — Eduardo Castilho
*Assistant Examiner* — Karlyannie M. Garcia
(74) *Attorney, Agent, or Firm* — Hovey Williams LLP

(57) ABSTRACT

Systems and methods for reducing false positives for financial transaction fraud monitoring using machine learning techniques. Using an original model for separating transactions into high risk and low risk categories for fraud, transactions falling into the high-risk category may be labeled as false positive or true positive. The labels and data associated with the transactions may be used to train two or more sequential false positive reduction models (FPRMs). Once a desired minimal amount of false positive labels are found in transactions labeled high risk by one of the FPRMs, that one of the FPRMs becomes the trained FPRM. Next, an additional transaction is processed using the original model and the trained FPRM, which then determines whether the additional transaction is at a high risk of being fraudulent.

6 Claims, 5 Drawing Sheets

Training Mode for FPRM

Production Mode (using trained FPRMs to reduce the false positives in production)

FIG. 4

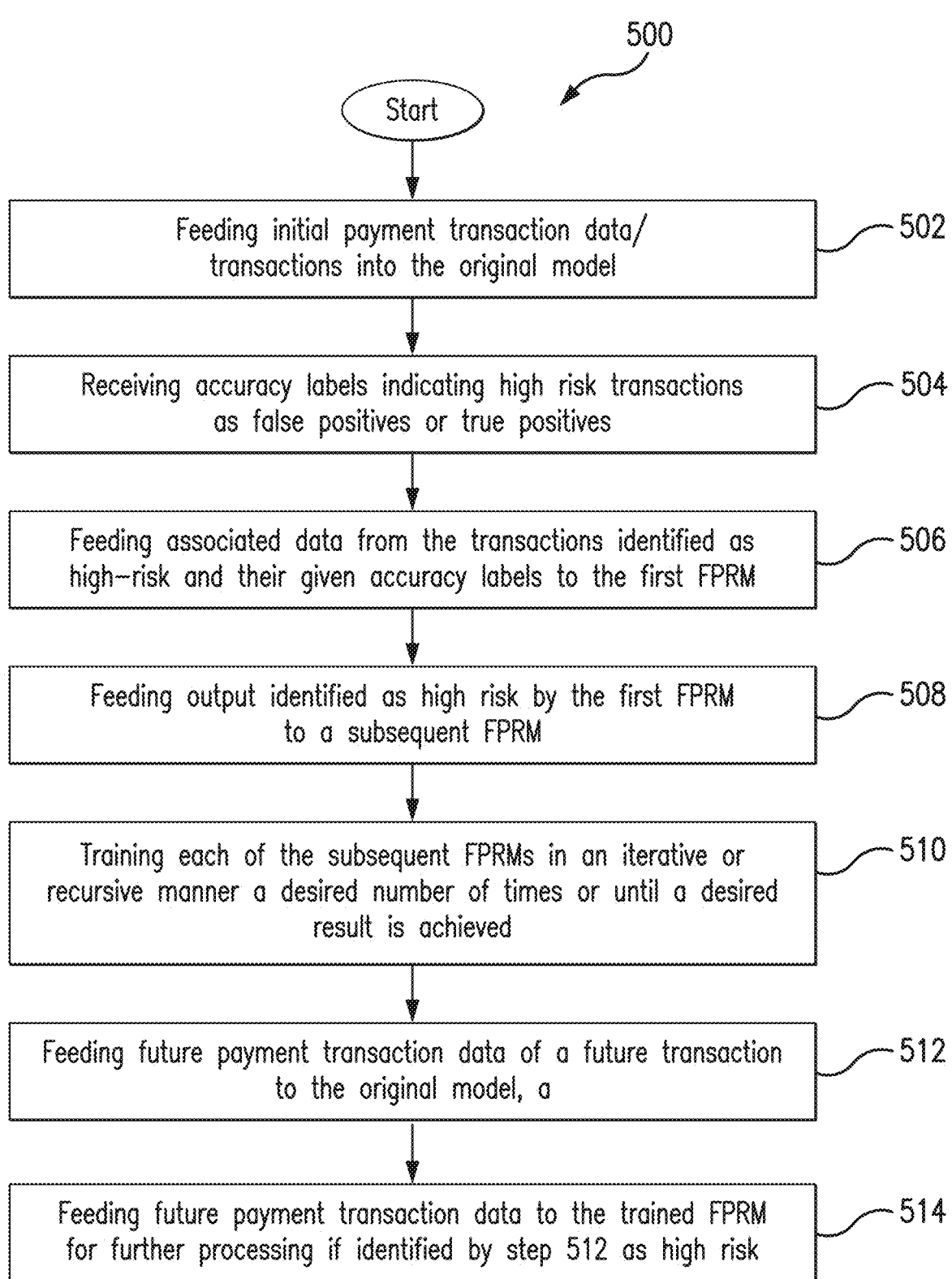

500

Start

Feeding initial payment transaction data/ transactions into the original model — 502

Receiving accuracy labels indicating high risk transactions as false positives or true positives — 504

Feeding associated data from the transactions identified as high-risk and their given accuracy labels to the first FPRM — 506

Feeding output identified as high risk by the first FPRM to a subsequent FPRM — 508

Training each of the subsequent FPRMs in an iterative or recursive manner a desired number of times or until a desired result is achieved — 510

Feeding future payment transaction data of a future transaction to the original model, a — 512

Feeding future payment transaction data to the trained FPRM for further processing if identified by step 512 as high risk — 514

FIG. 5

METHODS AND SYSTEMS FOR REDUCING FALSE POSITIVES FOR FINANCIAL TRANSACTION FRAUD MONITORING USING ARTIFICIAL INTELLIGENCE

RELATED APPLICATION

The present non-provisional U.S. patent application is a continuation of an earlier-filed non-provisional U.S. patent application Ser. No. 17/828,970, entitled "Methods and Systems for Reducing False Positives for Financial Transaction Fraud Monitoring Using Artificial Intelligence," filed on May 31, 2022, and incorporated by reference herein in its entirety.

TECHNICAL FIELD

The present disclosure relates to artificial intelligence processing systems and, more particularly, to electronic methods and complex processing systems for reducing false positives for financial transaction fraud monitoring using machine learning techniques.

BACKGROUND

In recent years, the use of payment cards and other cash-substitute payment instruments associated with transaction accounts has increased. Accompanying the increase in use of such payment means is a rise in fraudulent transaction attempts, many of which are successful. Tracking financial fraud in payment transactions is a very challenging task and remains a serious challenge for financial institutions. Once fraud patterns are captured, fraud and credit risk models are trained to react in the future. The fraud detection models take into consideration a list of locations, point of sale, amount of transaction, etc., which are marked as fraudulent in the past to detect fraudulent transactions in the future.

Some fraud detection methods err on the side of approving a transaction to minimize declines to cardholders but can result in more fraud occurring. On the other hand, some fraud models can be too aggressive and result in an overabundance of false positives. Resources may then be wasted analyzing and addressing these transactions that were falsely labeled as fraudulent. These wasted resources can equate to an immense loss in revenue and impact customer experience negatively each time a customer's transaction is incorrectly labeled as fraudulent. Thus, there is a need for a technical solution for reducing false positives in fraud monitoring.

SUMMARY OF THE DISCLOSURE

This summary is not intended to identify essential features of the present invention and is not intended to be used to limit the scope of the claims. These and other aspects of the present invention are described below in greater detail.

In one aspect, a computer-implemented method performed by a server system, can include a step of receiving payment transaction data associated with transactions previously identified as potentially fraudulent and accuracy labels preselected for each of the transactions. The accuracy labels can identify the transactions as a false positive or a true positive. Next, the method can include a step of feeding the payment transaction data and the accuracy labels to a first false positive reduction model (FPRM) to classify a first subset of the transactions with a high risk of being fraudulent and a second subset of the transactions with a low risk of being fraudulent. Then, the method can include a step of conducting supervised training of one or more subsequent FPRMs to produce one or more trained subsequent FPRMs by inputting the accuracy labels and the payment transaction data associated with one or more training subsets of the transactions into the one or more subsequent FPRMs in an iterative or recursive manner. This iterative or recursive training can continue until a desired accuracy metric is satisfied by output of the one or more subsequent FPRMs. An initial one of the one or more training subsets can include the first subset. Furthermore, any subsequent ones of the one or more training subsets may include those of the transactions classified with a high risk of being fraudulent by the immediately preceding one of the one or more subsequent FPRMs. Finally, the method can include a step of feeding future payment transaction data associated with a future transaction into at least one of the one or more trained subsequent FPRMs to classify the future transaction's risk of being fraudulent.

BRIEF DESCRIPTION OF THE FIGURES

Embodiments of the present invention are described in detail below with reference to the attached drawing figures, wherein:

FIG. 4 is a flow diagram depicting processing components including the trained FPRM in a financial transaction fraud analysis system to reduce false positives; and FIG. 5 depicts a flow chart of a method for reducing false positives for financial transaction fraud monitoring using machine learning techniques in accordance with embodiments described herein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to identifying and verifying entities requesting access to confidential information and/or financial services. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, operation, etc. described in one embodiment may also be included in other embodiments but is not necessarily included. Thus, particular implementations of the present invention can include a variety of combinations and/or integrations of the embodiments described herein.

Broadly characterized, the present invention relates to systems and methods for reducing false positives for financial transaction fraud monitoring using machine learning techniques. More particularly, the systems and methods herein use an original model for scoring data of various transactions as high risk or low risk and labels those scored as high risk as either a false positive or a true positive. Using this labeled transaction data, a false positive reduction model (FPRM) can be trained using the false positive and true positive accuracy labels and recursive or iterative training steps described in detail herein. The trained FPRM may be used in series with the original model, e.g., in a production environment, for future transactions to provide fewer false positives in financial transaction fraud monitoring.

Figure 1:
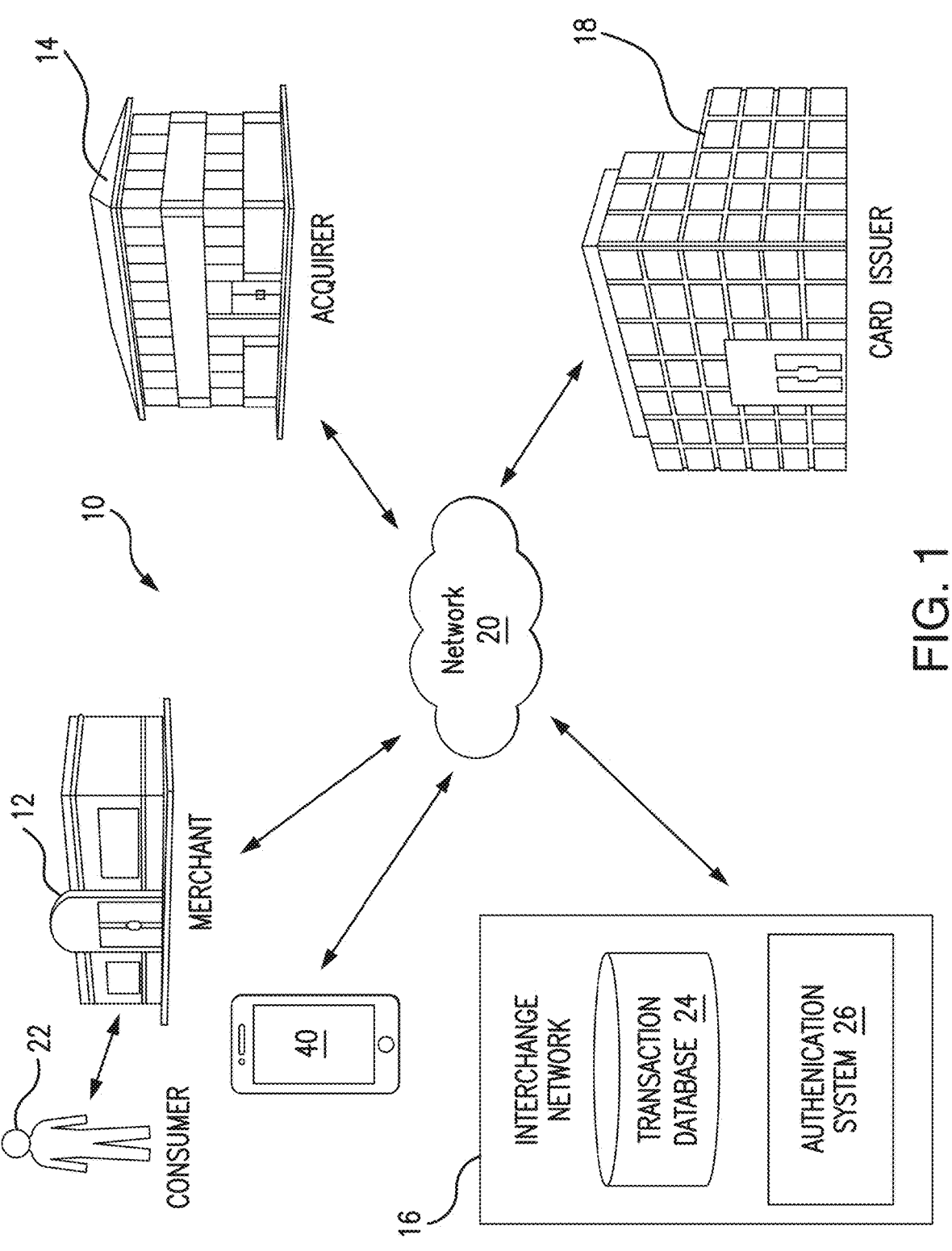
FIG. 1 is a block diagram of an example multi-party payment card network system in which transactions being analyzed herein can take place in accordance with some embodiments.

FIG. 1 generally depicts a system or environment in which the transactions described herein can take place. However, the transactions and associated financial transaction data can be obtained from other sources in other environments and/or using other systems without departing from the scope of the technology herein. Specifically, FIG. 1 is a block diagram of an example multi-party payment card network system 10. As used herein, the term "component" includes software or hardware particularly programmed to receive input, perform one or more processes as described herein using the input, and provide an output resulting from the performance of the one or more processes. The input, output, and processes performed by various components will be apparent to one skilled in the art based on the present disclosure.

In the exemplary embodiment, the payment card network system 10 facilitates providing interchange network services offered by an interchange network 16. In addition, the payment card network system 10 enables payment card transactions in which merchants 12, acquirers 14, and/or issuers 18 do not need to have a one-to-one relationship. Although parts of the payment card network system 10 are presented in one arrangement, other embodiments may include the same or different parts arranged otherwise, depending, for example, on authorization processes for purchase transactions, communication between computing devices, etc.

As used herein, the phrase "payment card network" or "interchange network" includes a system or network used for the transfer of funds between two or more parties using cash-substitutes. Transactions performed via a payment card network may include, for example, goods and/or service purchases, credit purchases, debit transactions, fund transfers, account withdrawals, and the like. Payment card networks may be configured to perform such transactions using cash-substitutes including, for example, and without limitation, payment cards, checks, financial accounts, and the like. Payment card networks may also be configured to perform such transactions via phone or smart phone payment apps or the like. For example, such transactions can be performed via a mobile device 40 (e.g., via a user mobile application running on the mobile device 40) of the cardholder, for example. The cardholder mobile device 40 may be, for example, a cellular telephone, a smart watch or other electronic wearable apparel, a tablet, an implanted smart device, a personal computing device, or any other electronic device capable of two-way digital communications which may be associated with a cardholder. In some embodiments, the mobile device 40 may be replaced with another computing device suitable for performing the functions disclosed herein (e.g., a desktop or laptop computer, a smart television, etc.). The payment card network and/or interchange network may include the payment card network as an entity, and the physical payment card network, such as the equipment, hardware, and software making up the network.

In the example embodiment, the payment card network system 10 generally includes the merchants 12, the acquirers 14, the interchange network 16, and the issuers 18, coupled together in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and consumers 22, etc.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data can include a unique account number (e.g., a PAN) associated with an account holder or consumer 22 using a payment card issued by an issuer, purchase data representing a purchase made by the cardholder, including a type of merchant, amount of purchase, date of purchase, and other data, which may be transmitted between any parties of the multi-party payment card network system 10. However, in some embodiments, financial transaction data can additionally or alternatively be associated with checks or other digital payment methods (e.g., smart phone apps).

In a typical transaction card system, a financial institution called the "issuer" issues a payment card, such as a credit card, to a cardholder or consumer 22, who uses the payment card to tender payment for a purchase from the merchant 12. In the example embodiment, the merchant 12 is typically associated with products, for example, and without limitation, goods and/or services, that are offered for sale and are sold to the consumers 22. The merchant 12 includes, for example, a physical location and/or a virtual location. A physical location includes, for example, a brick-and-mortar store, etc., and a virtual location includes, for example, an Internet-based store-front.

To accept payment with the payment card, the merchant 12 must normally establish an account with a financial institution that is part of the payment card network system 10. This financial institution is usually called the "merchant bank," the "acquiring bank," or the acquirer 14. When the cardholder 22 tenders payment for a purchase with a payment card, the merchant 12 requests authorization from the acquirer 14 for the amount of the purchase. The request may be performed over the telephone but is usually performed through the use of a point-of-sale terminal that reads the cardholder's account information from a magnetic stripe, a chip, or embossed characters on the payment card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase is covered by the cardholder's available credit line. Based on these determinations, the request for authorization will be declined or accepted. If the request is accepted, an authorization code is issued to the merchant 12.

When a request for authorization is accepted, the available credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 22 cancels a transaction before it is captured, a "void" is generated. If the cardholder 22 returns goods after the transaction has been captured, a "credit" is generated. The interchange network 16 and/or the issuer 18 stores the payment card information, such as, and without limitation, a type of merchant, a merchant identifier, a location where the transaction was completed, an amount of purchase, and a date and time of the transaction, in a transaction database 24.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12.

In some embodiments, the payment card transaction is a card present transaction conducted, for example, by swiping or dipping a payment card at the merchant's point-of-sale (POS) terminal. Alternatively, the payment card transaction may be a card-not-present transaction conducted, for example, with a payment card stored on file with the merchant or stored as digital wallet data in an electronic wallet on a consumer's computing device or phone. An interchange network 16 includes an authentication system 26 that is configured to analyze various data associated with the payment card transaction and provide various information to one or more parties involved in the payment card transaction, such as the merchant 12 and the acquirer 14. However, the authentication system 26 can be omitted or replaced without departing from the scope of the technology herein. Alternatively, in some embodiments, the authentication system 26 can perform one or more of the method steps described herein.

Figure 2:
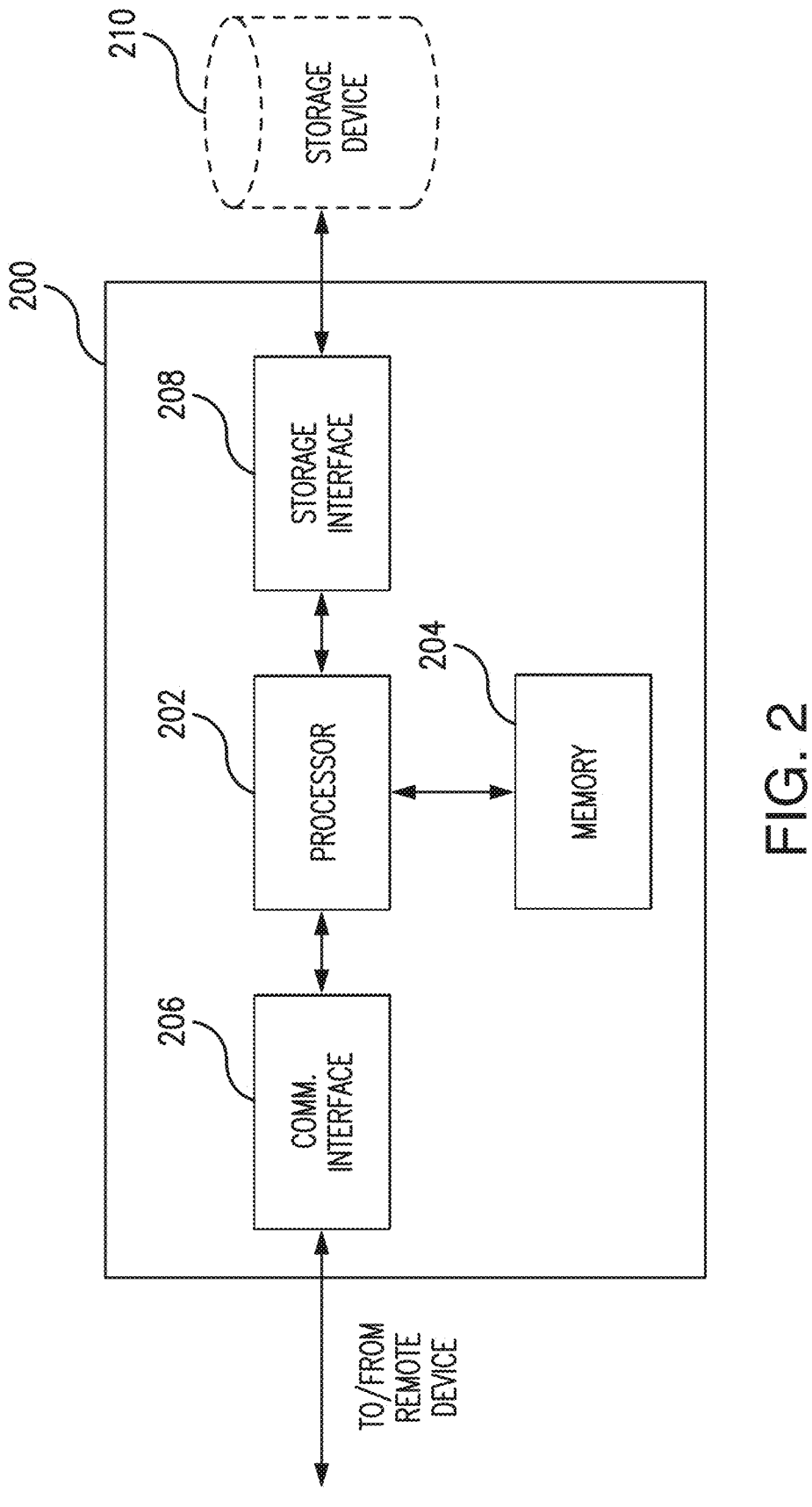
FIG. 2 is a simplified block diagram of an example server system via which various methods described herein can be performed in accordance with some embodiments.

FIG. 2 is an example configuration of a server system 200 by which various methods described herein can be performed. The server system 200 includes, but is not limited to, the transaction database 24 (shown in FIG. 1), the authentication system 26, and/or associated databases. In the example embodiment, the server system 200 includes a processor 202 for executing instructions. The instructions may be stored in a memory 204, for example. The processor 202 includes one or more processing units (e.g., in a multi-core configuration) for executing the instructions. The instructions may be executed within a variety of different operating systems on the server system 200, such as UNIX, LINUX, Microsoft Windows®, etc. More specifically, the instructions may cause various data manipulations on data stored in a storage device 210 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 202 is operatively coupled to a communication interface 206 such that the server system 200 can communicate with a remote device or another server system similar to the server system 200. For example, the communication interface 206 may receive communications from the cardholder's mobile device 40 or a user system via the Internet. In some embodiments, the communication interface 206 may send and receive communications to and from user interfaces, such as display screens, keyboards, a computer mouse or trackball, other display and/or user input devices, or the like.

The processor 202 is operatively coupled to the storage device 210. The storage device 210 is any computer-operated hardware suitable for storing and/or retrieving data. In some embodiments, the storage device 210 is integrated in the server system 200. In other embodiments, the storage device 210 is external to the server system 200 and is similar to the transaction database 24. For example, the server system 200 may include one or more hard disk drives as the storage device 210. In other embodiments, the storage device 210 is external to the server system 200 and may be accessed by a plurality of server systems 200. For example, the storage device 210 may include multiple storage units such as hard disks or solid-state disks in a redundant array of inexpensive disks (RAID) configuration. The storage device 210 may include a storage area network (SAN) and/or a network attached storage (NAS) system.

In some embodiments, the processor 202 is operatively coupled to the storage device 210 via a storage interface 208. The storage interface 208 is any component capable of providing the processor 202 with access to the storage device 210. The storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the storage device 210.

The memory area 204 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some example embodiments, the server system 200 receives a plurality of transaction data or fraud-related transaction data obtained over a selected or given period of time either from the storage device 210 and/or via the communication interface 206. In some embodiments, the server system 200 is in communication with one or more of the acquirer 14, the issuer 18, and the merchant 12 during a payment card transaction associated with a user, such as the cardholder 22 (shown in FIG. 1). The server system 200 can perform one or more of the method steps described herein.

Various methods and models described herein may utilize machine learning programs or techniques to perform the analyses outlined below. For instance, machine learning program(s) may recognize or determine patterns and/or inconsistencies between expected or normal behavior on the one hand, and actual end user behavior on the other hand. The machine learning techniques or programs may include curve fitting, regression model builders, convolutional or deep learning neural networks, combined deep learning, pattern recognition, or the like. Based upon this data analysis, the computer-implemented methods and/or machine learning program(s) described below may flag high-risk transactions, low-risk transactions, true positives, and/or false positives for further analysis as discussed in more detail below.

In supervised machine learning, a computer-implemented method or program may be provided with example inputs (e.g., data associated with past transactions) and their associated outputs (e.g., high risk, low risk, true positive fraudulent transaction, or false positive fraudulent transaction), and may seek to discover a general rule that maps inputs to outputs, so that when subsequent novel inputs are provided the processing element may, based upon the discovered rule, accurately predict the correct output. In unsupervised machine learning, the computer-implemented method or program may be required to find its own structure in unlabeled example inputs.

The computer-implemented methods or programs herein may utilize classification algorithms such as Bayesian classifiers and decision trees, sets of pre-determined rules, and/or other algorithms to generate risk categories (e.g., high risk or low risk). Moreover, in a preferred embodiment, different and/or separately-trained algorithms and models are optimized for use in improving risk categorization to result in fewer false positives (i.e., labeled high risk when transaction is not fraudulent).

Figure 3:
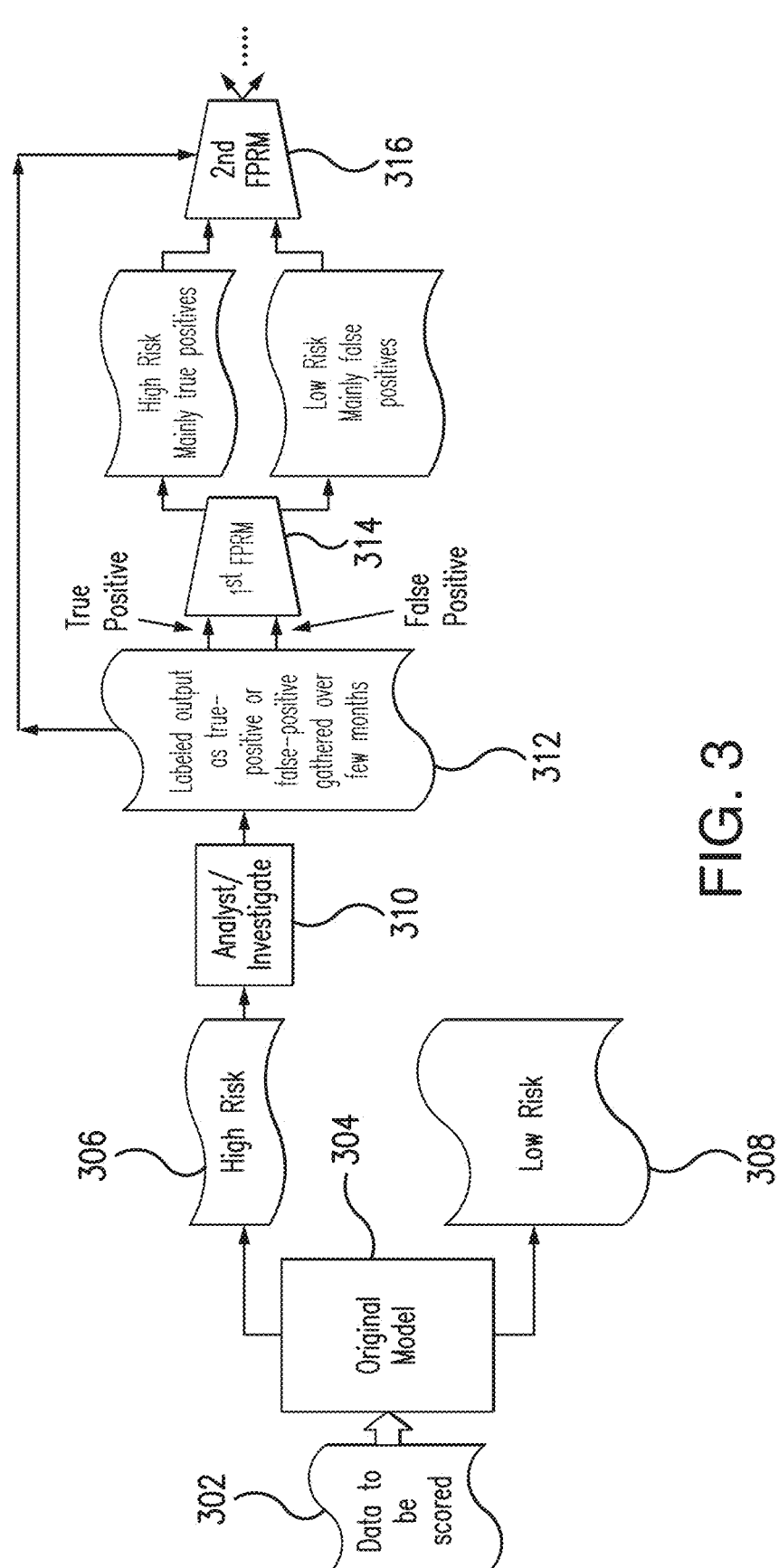
FIG. 3 is a flow diagram depicting processing components of a computer-implemented method for training a false positive reduction model (FPRM) for use as part of a financial transaction fraud analysis system.
Figure 4:
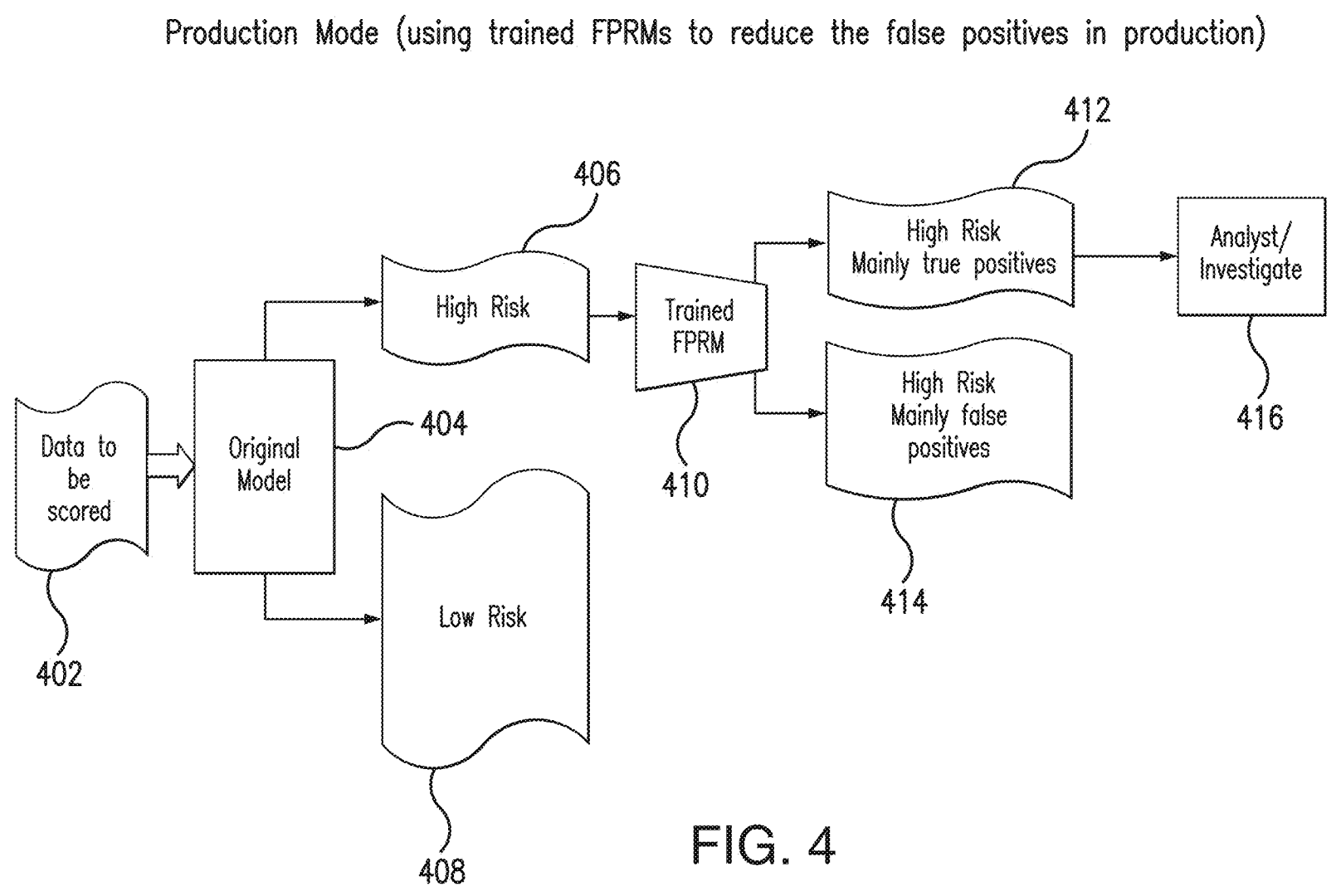

Using one or more of the systems depicted in FIGS. 1-2, false positive reduction models (FPRMs) can be trained and applied to analyze the risk of financial transactions being fraudulent with a reduction in false positives over prior art methods. Specifically, FIG. 3 depicts an FPRM setup/training flow chart, utilizing various iterative machine learning techniques on transaction data to be scored. FIG. 4 depicts a trained FPRM in use for one or more future transactions within a production environment. Specifically, FIG. 4 depicts a flow chart for a method for reducing false positives for financial transaction fraud monitoring using machine learning techniques as described herein. Note that although the embodiments herein are described for use with financial transactions, other data to be scored for various risk analysis can be used without departing from the scope of the technology described herein.

In FIG. 3, the data 302 to be scored can be provided to an original model 304. This can involve, for example, feeding initial payment transaction data associated with a plurality of customers from a transaction database into the original model 304 (e.g., see block 502 in FIG. 5). The original model 304 can be an initial fraud determination model used to make an initial determination as to whether a transaction is high risk (depicted as output 306) or low risk (depicted as output 308) for being a potentially fraudulent transaction. Specifically, a preliminary fraud detection analysis can be performed by running data 302 associated with each of a plurality of transactions through the original model 304. The original model 304 can then delineate or classify the transactions or their associated initial payment transaction data into an original high-risk category (e.g., potentially fraudulent) or an original low risk category (e.g., likely not fraudulent). Note that, in some embodiments, the initial payment transaction data is associated with a plurality of initial transactions over a given period of time (e.g., transactions gathered or analyzed over the last 3 months for fraud risk or fraud detection).

The original model 304 may include pattern recognition algorithms or machine learning analysis known in the art, such as those utilizing neural networks, decision trees, fuzzy logic, or any other machine learning models known in the art. For example, the original model 304 may be created via supervised machine learning algorithms. In some embodiments, the outputs 306, 308 of the original model 304 provide scores or other indications of high risk or an indication of low risk for each of the transactions. For example, the original model 304 can produce a risk score that associates high risk with a higher score and low risk with a lower risk score. In some embodiments, the original model 304 can be trained on labeled data with 0 meaning genuine (i.e., not a fraudulent transaction) and 1 meaning fraud (i.e., a fraudulent transaction). In some embodiments, the original model 304 can classify a transaction as being at high risk of being fraudulent or at low risk of being fraudulent based on at least one transaction amount, online versus offline transactions, Point of Sale (POS) versus Barcode based transactions, and/or market-specific fraud patterns. For example, the original model may classify transactions associated with initial payment transaction data as at high risk of being fraudulent or at low risk of being fraudulent based on at least one of: (a) transaction amount, (b) online versus offline transactions for a corresponding one of the plurality of customers, (c) Point of Sale (POS) versus Barcode based transactions for the corresponding one of the plurality of customers, and (d) market-specific fraud patterns. However, other transaction data can be analyzed using the models described herein for making the determinations described herein without departing from the scope of the technology described herein.

In some embodiments, the original model 304 can generate a probability of fraudulent transaction from fraud analysis in the range of 0%-100%, for example where 0% is no risk of fraud and 100% is certain risk of fraud. In this case, the original model 304 may assign a range and/or threshold (e.g., >70%) defining high risk transactions whereby further fraud analysis is required. Accordingly, the original model 304 can implement a certain threshold, and all scored data above the threshold can result in alerts that go to analysts for final disposition (e.g., depicted as the "analyst/investigate" block 310). Out of these alerts, a certain portion of the transactions will be classified as real fraud or "true positives" and the rest as "false positives."

The method can further include receiving labels (e.g., from the analysts) indicating the false positives and the true positives among the high-risk transactions, as depicted in block 312 (e.g., see block 504 in FIG. 5). For example, analysts can analyze the high-risk transactions and determine which ones of the transactions identified as high-risk transactions turned out to be fraudulent and which ones were mislabeled and were actually not fraudulent (i.e., "false positives"). This analysis can be performed using a variety of techniques and can include input from customers and other techniques to verify the transactions identified as high risk.

The associated data from these high-risk transactions and their given labels (e.g., false positive or true positive) can be received by or fed into a first FPRM 314 (e.g., see block 506 in FIG. 5). For example, in some embodiments, the systems described herein can automatically feed the financial transaction data and accuracy labels for each of the transactions identified as high risk by the original model 304 to the first FPRM 314 for supervised training. In some embodiments, the first FPRM 314 will only score the transactions identified as high-risk by the original module 304 (not those identified as low risk 308). The first FPRM 314 can be configured or trained based on these values and/or labels to classify a first subset of the transactions as being at high risk of being fraudulent and a second subset of the transactions as being at low risk of being fraudulent.

The first FPRM 312 and any of the FPRMs described herein can be built using pattern recognition algorithms or machine learning analysis known in the art, such as neural networks, decision trees, random forests, fuzzy logic, and/or any artificial intelligence (AI)-based technology or a combination thereof. For example, the first FPRM or any other FPRMs described herein may be generated via supervised machine learning algorithms. The accuracy labels can be used as targets during training of the first FPRM 314 and/or any of the subsequent FPRMs described herein. The first FPRM 314 can thus be trained based on the high-risk transactions (e.g., the high-risk transactions output from the original model 304) and their given accuracy labels to further separate the false positives from the true positives by creating a score that will score the transactions labeled as false positives lower than the transactions labeled as true positives. In some embodiments, training the first FPRM 314 can also include threshold adjustments or the like associated with whether the first FPRM 314 outputs a transaction as high risk or low risk.

Next, the methods and systems described herein can conduct supervised training of one or more subsequent FPRMs to produce one or more trained subsequent FPRMs.

For example, output from the first FPRM 314 can then be used as input to a subsequent FPRM, such as a second FPRM 316 (e.g., see block 508 in FIG. 5). In some embodiments, only the alerted (i.e., categorized as high risk) transactions from the first FPRM 314 are sent to the second FPRM 316 to further separate the false positives from true positives. Furthermore, given accuracy labels (e.g., false positive or true positive) for each of the transactions input into the second FPRM 316 can also be used as input into the second FPRM 316. For example, as with the first FPRM 314, the accuracy labels can be used for targets during a machine learning/training process. A resulting output from the second FPRM 316 can likewise be delineated to further separate the false positives from the true positives.

In some embodiments, the supervised training noted above is performed by inputting the accuracy labels and the payment transaction data associated with one or more training subsets of the transactions into the one or more subsequent FPRMs in an iterative or recursive manner until a desired accuracy metric is satisfied by output of the one or more subsequent FPRMs. For example, the training described for the first and second FPRMs 314,316 can continue as an iterative process a desired number of times or until a desired output is achieved (i.e., the high-risk transactions output from the Nth FPRM contain no more false positives or less than a particular threshold amount of false positives) (e.g., see block 510 in FIG. 5).

In some embodiments, the number of iterations of FPRMs through which the transaction data and its associated labels are applied during training can be based on performance requirements, for example. For instance, the systems described herein may automatically input the accuracy labels and the payment transaction data associated with a training subset of the transactions into one or more subsequent FPRMs in an iterative or recursive manner until a desired accuracy is achieved in comparison to a number, ratio, or percentage of false positives or true positives. The training subset of the transactions can initially comprise the first subset of transactions output from the first FPRM or another subset of transactions from the second FPRM having a high risk of being fraudulent and for each next iteration the training subset of transactions input into a next one of the one or more subsequent FPRMs can comprise transactions identified as having a high risk of being fraudulent by an immediately prior one of the subsequent FPRMs.

While any number of iterations can be performed in this training or set-up process for developing a trained FPRM, as depicted in FIG. 4, note that some embodiments may only use two FPRMs or three FPRMs, for example, without departing from the technology described herein. For example, in some embodiments, the iterative process may conclude once no significant change is detected in the number of false positives included in high-risk category output from a last one of the FPRMs. A last one of the FPRMs—with reference to the sequential training operations described above—can be used, alone or in combination with one or more of the other FPRMs, as the trained FPRM in FIG. 4.

Any of the FPRMs described above can, once trained, be used as a trained FPRM 410. For example, the first FPRM and/or the second FPRM could be used as the trained FPRM 410 herein. In other embodiments, once a final Nth FPRM is trained, it can be used as the trained FPRM 410. The trained FPRM 410 can then be used in a production method as depicted in FIG. 4. Specifically, a production environment system using the trained FPRM 410 can feed future payment transaction data 402 of a future transaction to an original model 404 (e.g., see block 512 of FIG. 5). The configuration and operation of the original model 404 can be identical or substantially identical to the original model 304. The original model 404 can thus use one or more thresholds to classify the original model output therefrom. The original model output can classify the future transaction processed thereby as being at high risk of being fraudulent 406 or at low risk of being fraudulent 408, for example.

If or when the future transaction is classified as high risk 406 by the original model 404, the system using the trained FPRM 410 can automatically feed the future payment transaction data or other data associated with the future transaction to the trained FPRM 410 (e.g., see block 514 in FIG. 5). As noted above, the trained FPRM 410 can be a last one of the subsequent FPRMs (which could, in some embodiments, be the second FPRM, for example). Then the trained FPRM 410 can make a subsequent determination or classification indicating the future transaction is at a high risk of being fraudulent 412 or at a low risk of being fraudulent 414. If the trained FPRM 410 classifies the future transaction as being at a high risk of being fraudulent 412, then further analysis or investigation (i.e., block 414) may be required. This analysis can be performed manually, in an automated fashion, or using a combination of manual and automated methods known in the art.

Method steps for reducing false positives for financial transaction fraud monitoring using machine learning techniques will now be described in more detail, in accordance with various embodiments of the present invention. The steps of method 500 may be performed in the order as shown in FIG. 5, or they may be performed in a different order. Furthermore, some steps may be performed concurrently as opposed to sequentially. In addition, some steps may not be performed.

As illustrated in FIG. 5, the method 500 can include the steps of feeding initial payment transaction data associated with a plurality of customers from a transaction database into the original model, as depicted in block 502. The method 500 can further include a step of receiving accuracy labels (e.g., from the analysts) indicating the false positives and the true positives among the transactions identified (such as by the original model 304) as high-risk, as depicted in block 504. This method step can include receiving such accuracy labels from analyst or user input and/or using various automated tools for checking the accuracy of the predictions or classifications made by the original model.

The method 500 can then include feeding associated data from the transactions identified as high-risk and their given accuracy labels (e.g., false positive or true positive) to the first FPRM, as depicted in block 506. Next, the method 500 can include a step of feeding output from the first FPRM 314 to a subsequent FPRM, as depicted in block 508. For example, a subsequent FPRM can include the second FPRM 316 as described above. The output from the first FPRM 314 fed to the second FPRM can be associated with transactions identified by the first FPRM as having a high risk of being fraudulent. The first FPRM, the second FPRM, and any other subsequent FPRMs can also use the given labels of each of the transactions as targets while training the FPRMs.

Furthermore, the method 500 can include training each of the subsequent FPRMs in an iterative or recursive manner a desired number of times or until a desired result is achieved, as depicted in block 510. For example, the method can include conducting supervised training of one or more subsequent FPRMs to produce one or more trained subsequent FPRMs by inputting the accuracy labels and the payment transaction data associated with one or more training subsets of the transactions into the one or more subsequent FPRMs in an iterative or recursive manner. This recursive or iterative training can continue until a desired accuracy metric is satisfied by output of the one or more subsequent FPRMs. An initial one of the one or more training subsets may comprise the first subset and any subsequent ones of the one or more training subsets may comprise those of the transactions classified with high risk of being fraudulent by the immediately preceding one of the one or more subsequent FPRMs.

The method 500 can further include feeding future payment transaction data of a future transaction to the original model, as depicted in block 512, and automatically feeding the future payment transaction data or other data associated with the future transaction to the trained FPRM for processing thereby, as depicted in block 514. As noted above, the trained FPRM 410 can be a last one of the subsequent FPRMs in the iterative or recursive training described above. However, the trained FPRM 410 may include other ones of the FPRMs described and trained as discussed herein without departing from the scope of the technology described herein. The trained FPRM 410, based on its training described above, can make a subsequent classification or determination of whether the future transaction is at a high risk of being fraudulent 412 or at a low risk of being fraudulent 414.

In some embodiments, when the original model 404 is retrained or updated, the trained FPRM 410 should also be updated/retrained accordingly, as described in FIG. 3 and detailed above. That is, the trained FPRM 410 may need to be updated/retrained at the same time/frequency as the original model 404, so that they operate cooperatively together to achieve the desired metrics. Likewise, in some embodiments, if the operating threshold of the original model 404 changes the trained FPRM 410 may need to be retrained on the new set of alerts/classifications output from the original model 404 with its new thresholds.

Any actions, functions, operations, and the like recited herein may be performed in the order shown in the figures and/or described above or may be performed in a different order. Furthermore, some operations may be performed concurrently as opposed to sequentially. Although the computer-implemented method is described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all the operations described herein, including some or all of the operations of the computer-implemented method. The computer program stored on the computer-readable medium may instruct the processor and/or other components of the system to perform additional, fewer, or alternative operations, including those discussed elsewhere herein.

All terms and phrases used herein are to be broadly interpreted unless otherwise stated. For example, the phrases "transaction card," "payment card," and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EE-PROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method performed by a server system, the method comprising:

feeding transactions, each comprising initial payment transaction data associated with one or more customers from a transaction database, into an original model configured to classify an initial subset of the transactions into an original high-risk category;

feeding the initial subset and accuracy labels selected for each of the transactions of the initial subset to a first false positive reduction model (FPRM), wherein the accuracy labels respectively identify corresponding ones of the transactions of the initial subset as either false positive or true positive and the first FPRM is trained via machine learning using the accuracy labels corresponding to the transactions of the initial subset as targets;

classifying, via the first FPRM, a first subset of the initial subset of the transactions with a high risk of being fraudulent as belonging to a high-risk category;

feeding the first subset to a second FPRM, wherein the second FPRM is trained via machine learning using the accuracy labels corresponding to the transactions of the first subset as targets;

classifying, via the second FPRM, a second subset of the first subset as belonging to the high-risk category;

determining that a quantity of the transactions of the first subset labeled false positive and a quantity of the transactions of the second subset labeled false positive are not equal nor within a threshold range of each other;

based on determining that the quantity of the transactions of the first subset labeled false positive and the quantity of the transactions of the second subset labeled false positive are not equal nor within the threshold range of each other, determining not to output the second FPRM as a trained FPRM and to train a subsequent FPRM;

feeding the second subset to the subsequent FPRM, wherein the subsequent FPRM is trained via machine learning using ones of the accuracy labels corresponding to the transactions of the second subset as targets;

classifying, via the subsequent FPRM, a third subset as belonging to the high-risk category;

determining that a quantity of the transactions of the second subset labeled false positive and a quantity of the transactions of the third subset labeled false positive are equal or within the threshold range of each other;

outputting the subsequent FPRM as the trained FPRM based on determining that the quantity of the transactions of the second subset labeled false positive and the quantity of the transactions of the third subset labeled false positive are equal or within the threshold range of each other;

feeding additional payment transaction data associated with an additional transaction into the trained FPRM;

classifying the additional transaction as having a high fraud risk via the trained FPRM; and sending an indication to a merchant that the additional transaction is declined based on the high fraud risk, wherein the first FPRM, the second FPRM, and the at least one subsequent FPRM are trained using types of machine learning selected from the group consisting of: neural networks, decision trees, random forests, and fuzzy logic.

2. The computer-implemented method of claim 1, further comprising determining that a threshold ratio or percentage of the transactions of the third subset are labeled false positive, wherein the outputting of the subsequent FPRM as the trained FPRM is further based on the determining that the threshold ratio or percentage of the transactions of the third subset are labeled false positive.

3. The computer-implemented method of claim 1, wherein at least one of a group consisting of the original model, the first FPRM, the second FPRM, and the subsequent FPRM is trained using supervised machine learning algorithms.

4. The computer-implemented method of claim 1, wherein the original model is configured to classify the initial subset of the transactions into the original high-risk category based on at least one of: (a) transaction amount, (b) online versus offline transactions for the corresponding one of the one or more customers, (c) Point of Sale (POS) versus Barcode based transactions for at least one of the one or more customers, and (d) market-specific fraud patterns.

5. The computer-implemented method of claim 1, wherein the initial payment transaction data is associated with a plurality of initial transactions over a given period of time.

6. The computer-implemented method of claim 1, wherein the additional payment transaction data is received by the trained FPRM from the original model and consists of a subset of the additional payment transaction data identified as having a high risk of being fraudulent by the original model based on one or more thresholds.

* * * * *